Aug. 11, 1964  W. HENNIG ETAL  3,143,942
ADAPTOR SOCKET
Filed Aug. 11, 1960
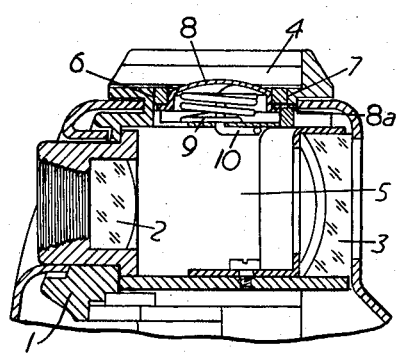
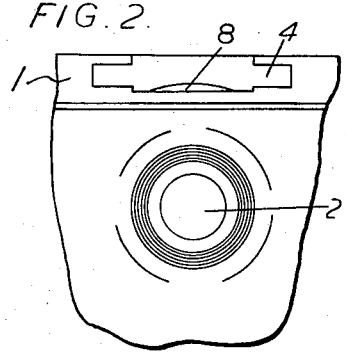
Inventors
WALTER HENNIG
HERBERT WELZEL
By Irvin S. Thompson
Attorney

United States Patent Office 3,143,942
Patented Aug. 11, 1964

3,143,942
ADAPTOR SOCKET
Walter Hennig and Herbert Welzel, Dresden, Germany, assignors to VEB Kamera- und Kinowerke Dresden, Dresden, Germany
Filed Aug. 11, 1960, Ser. No. 48,930
2 Claims. (Cl. 95—11.5)

The invention relates to an adaptor socket for photographic or cinematographic cameras, which is formed by the camera housing or wherein a resilient clamp body extends into the space provided for the adaptor foot of auxiliary apparatus.

Constructions which have become known place the springing arrangement for clamping the adaptor foot in the adaptor socket, which for this purpose is produced from a piece of resilient material.

Other proposals provide at the bottom of the adaptor socket one or more leaf springs, one solution having become known wherein this leaf spring serves at the same time as light-screening material towards the viewfinder housing.

Another solution uses a ball catch for the springing.

The first mentioned constructions have the disadvantage that the springing of the material, which for reasons of strength is relatively stout, is very hard, that is to say the elasticity of the retaining lugs is very slight. This often leads to damage or seizing of the adaptor foot of the auxiliary apparatus. On the other hand, the danger exists that the retaining lugs may be bent up by excessively great loading and springing no longer takes place at all on pushing in of an adaptor foot. In order to merge the adaptor sockets, produced from one piece, harmonically into the external form of the camera, it becomes necessary to provide appropriate depressions in the covering cap or in the camera housing.

The further stated proposals form these depressions themselves as adaptor sockets therefor, and provide one or more leaf springs at the bottom thereof. In the case of this last-mentioned style of construction it is disadvantageous that securing means must be used for the securing of the leaf springs, which are externally visible. The production of these securing means becomes expensive, since by reason of their visibility they possess a high quality of the surface and must be surface-treated. If it is desired to avoid the externally visible securing means, complicated spring forms become necessary, which also make the production more expensive. Where the metallically shining external surfaces are to be gold-eloxadized, the surface-treatment of the surface of the leaf spring causes difficulties, because the eloxal process is only usable for aluminum. A leaf spring produced from aluminum however as is known does not possess the elasticity of a steel spring.

It is further known to equip photographic cameras with flash-connection contacts for the purpose of shutter-synchronous lighting of flash lamps. The contacts are here constructed as connection nipples for the flash cable of a flash apparatus. Especially in the case of miniature cameras, except those of small construction (so-called pocket cameras) it is inexpedient to use large flash apparatus with a complicated mounting and cable connection. Furthermore, the connection cables often cause a disturbance in the operation of the camera.

The invention removes these disadvantages and achieves further advantages due to the fact that, preferably in the middle of the adaptor socket, formed by the camera housing itself, an aperture leading to a viewfinder housing formed at the same time by the camera housing is closed in light-tight fashion by a cap subject to spring action and domed towards the adaptor socket, which cap extends with at least a part of its domed surface into the space of the adaptor socket, which is filled by the adaptor foot of an inserted auxiliary apparatus. The invention further solves the problem due to the fact that a resilient clamping body extending into the space provided for the adaptor foot of auxiliary apparatus carries or forms a contact means for the connection of a flash attachment.

The invention is to be explained in greater detail hereinafter by reference to an example from which further features pertaining thereto may be seen. All details have been avoided which are not directly connected with the invention.

FIGURE 1 shows a section through a viewfinder arrangement in a camera with adaptor socket in accordance with the invention lying thereabove; and FIGURE 2 shows an elevation of FIGURE 1.

In a camera housing 1 having a viewfinder arrangement 2, 3 there is provided an adaptor socket 4. In an aperture 6 leading from the adaptor socket 4 to the internal space of the viewfinder 5 there is inserted an insulating ring or cup 7, which in turn receives a cap 8. This cap 8 has a flange 8a seating on a first abutment or step in the insulating ring 7, and a domed part into which enters the internal space of the adaptor socket 4. A spring 9 is compressed between the ring or cup 7 and the inside bottom of cap 8 to hold the cap with its flange 8a seating on the first abutment. The cap 8 is connected electrically by cable 10 with a flash control arrangement and a shutter.

The insulating ring 7 and the cap 8 guarantee the light-tight closure of the internal space 5 of the viewfinder against stray light. On pushing in of the adaptor foot of a flashlight, a contact arranged therein, when the end position is reached, meets the domed surface of the cap 8, the electrical connection of shutter and flashlight is constituted. At the same time, the adaptor foot of the flashlight—as obviously also the adaptor foot of other auxiliary equipment—is clamped fast in the adaptor socket 4 by the cap 8 subject to the action of the spring 9.

We claim:

1. In a camera casing having a viewfinder housing provided therein, lens members disposed in said viewfinder housing in spaced relationship, an adaptor socket disposed in said viewfinder housing externally of said lens members for receiving and supporting therein an auxiliary apparatus such as a flash attachment, said adaptor socket having an aperture therein disposed between said lens members, a movable cap member disposed snugly in said aperture and having flange means which engage the interior of said viewfinder housing adjacent said aperture to prevent the cap member from passing through the aperture and a dome-shaped portion that extends a short distance into said adaptor socket, electrical means connected to said cap member, and spring means engaging said cap member to normally maintain said flange means in abutting engagement with the interior of said viewfinder housing, the snugness of the cap member in said aperture and said flange means engaging the interior of the viewfinder housing providing a tight sealing relationship, said cap member, upon an auxiliary apparatus being disposed in said adaptor socket, engaging said auxiliary apparatus to maintain same securely therein and to provide electrical contact thereto.

2. In a camera casing having a viewfinder housing provided therein, lens members disposed in said viewfinder housing in spaced relationship, an adaptor socket disposed in said viewfinder housing externally of said lens members for receiving and supporting therein an auxiliary apparatus such as a flash attachment, said adaptor socket having an aperture therein disposed between said lens members, an insulating ring member mounted in said aperture and having an abutment therein, a movable cap member disposed snugly in said ring member and having flange means which engage said abutment to prevent the cap member from passing through the aperture and a dome-shaped portion that extends a short distance into said adaptor socket, electrical means connected to said cap member, and spring means engaging said cap member to normally maintain said flange means in abutting engagement with said abutment, the snugness of the cap member in said ring member and the flange means engaging said abutment providing a tight sealing relationship, said cap member upon an auxiliary apparatus being disposed in said adaptor socket engaging said auxiliary apparatus to maintain same securely therein and to provide electrical contact thereto.

References Cited in the file of this patent

UNITED STATES PATENTS

| | | |
|---|---|---|
| 2,317,465 | Kende et al. | Apr. 27, 1943 |
| 2,706,803 | Templeton | Apr. 19, 1955 |

OTHER REFERENCES

Kuppenbender et al., Ser. No. 323,200, published May 4, 1943.